US012811774B2

(12) United States Patent
Hong Guan et al.

(10) Patent No.: US 12,811,774 B2
(45) Date of Patent: Nov. 24, 2026

(54) DYNAMIC PRIVACY-CONSISTENT ENCRYPTION SYSTEM FOR FEDERATED LEARNING

(71) Applicant: Dell Products L.P., Round Rock, TX (US)

(72) Inventors: Tan Hong Guan, Kuala Lumpur (MY); Kailash Talreja, Mumbai (IN); Saurabh Jha, Leander, TX (US)

(73) Assignee: Dell Products L.P., Round Rock, TX (US)

(*) Notice: Subject to any disclaimer, the term of this patent is extended or adjusted under 35 U.S.C. 154(b) by 10 days.

(21) Appl. No.: 19/185,907

(22) Filed: Apr. 22, 2025

(65) Prior Publication Data

US 2026/0342534 A1 Oct. 29, 2026

(51) Int. Cl.

| | |
|---|---|
| ***G06N 20/00*** | (2019.01) |
| ***G06F 17/40*** | (2006.01) |
| ***H04L 9/00*** | (2022.01) |
| *G06F 17/16* | (2006.01) |
| *G06J 1/02* | (2006.01) |

(52) U.S. Cl.
CPC .................................... *H04L 9/008* (2013.01)

(58) Field of Classification Search
None
See application file for complete search history.

(56) References Cited

U.S. PATENT DOCUMENTS

2025/0182778 A1 * 6/2025 Schalkwyk ............ G06N 3/098

FOREIGN PATENT DOCUMENTS

CN 112182649 A * 1/2021 ......... H04L 63/0428

OTHER PUBLICATIONS

Cognitive Load Optimization for Contact Center Agents Using Real-Time Monitoring and AI-Driven Workload Balancing. Arcot. IJS-CESIT. (Year: 2023).*
Heterogeneous Federated Learning: State-of-the-art and Research Challenges. Fang. ACM. (Year: 2023).*
Landscape of machine learning evolution: privacy preserving federated learning frameworks and tools. Nguyen. Springer. (Year: 2024).*
Efficiency Optimization Techniques in Privacy-Preserving Federated Learning With Homomorphic Encryption: A Brief Survey. Xie . IEEE. (Year: 2024).*

* cited by examiner

*Primary Examiner* — Venkat Perungavoor
(74) *Attorney, Agent, or Firm* — Chamberlain, Hrdlicka, White, Williams & Aughtry; Aly Z. Dossa

(57) ABSTRACT

A method for managing a shared model includes: providing a first dataset of a first client to a database; performing preprocessing on the first dataset to obtain preprocessed data; providing the preprocessed data to a first engine; training the shared model using the preprocessed data; obtaining a set of gradients for a set of parameters of the shared model; analyzing the set of gradients to obtain a gradient flow for each of the set of gradients; applying homomorphic encryption on sensitive gradients to obtain encrypted gradients (EGs); applying obfuscation on non-sensitive gradients to obtain obfuscated gradients (OGs); computing an encryption probability of each of the EGs and the OGs; making a first determination that an encryption level of an EG of the EGs needs to be updated; and updating the encryption level of the EG to an OG.

20 Claims, 5 Drawing Sheets

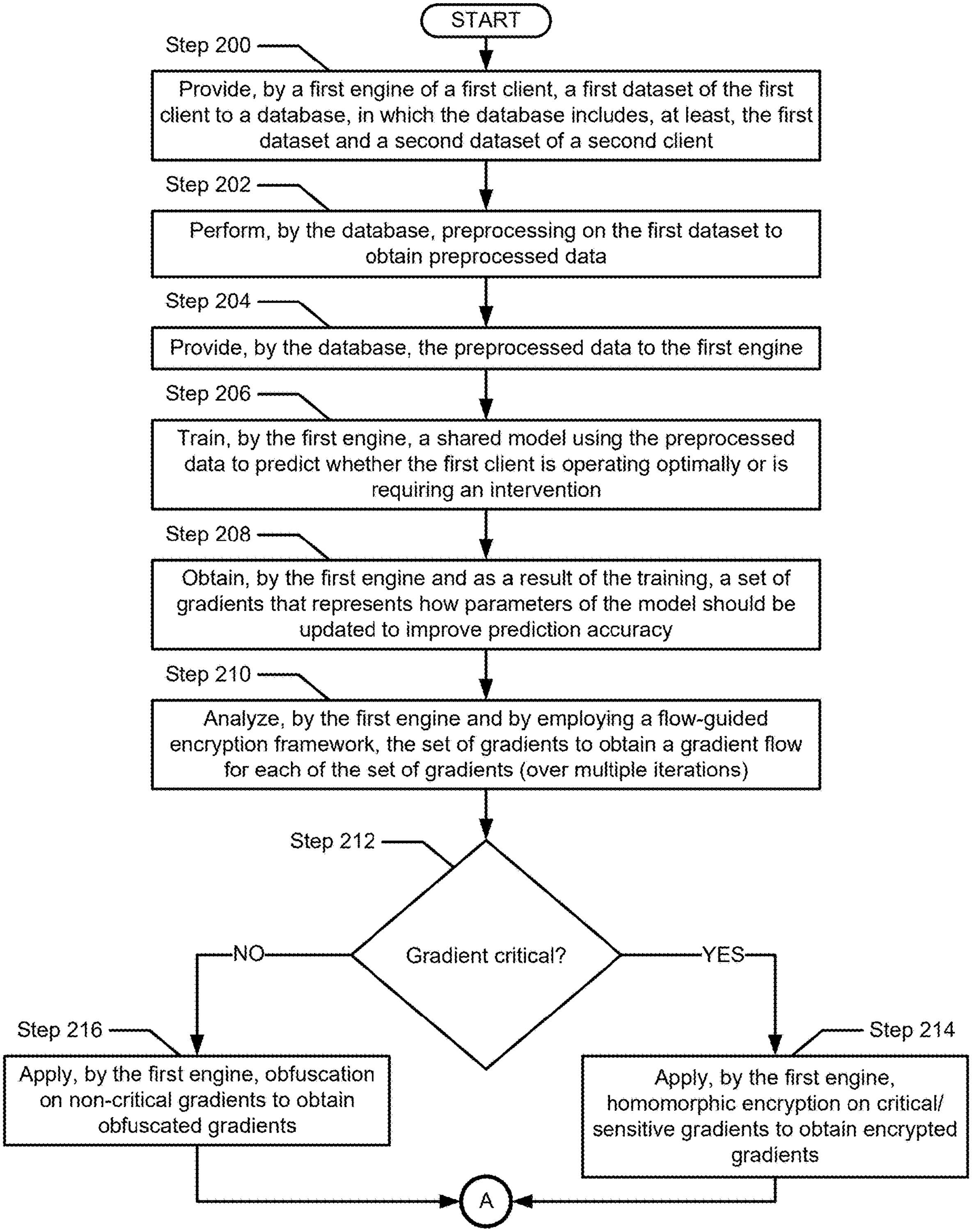
FIG. 2.1

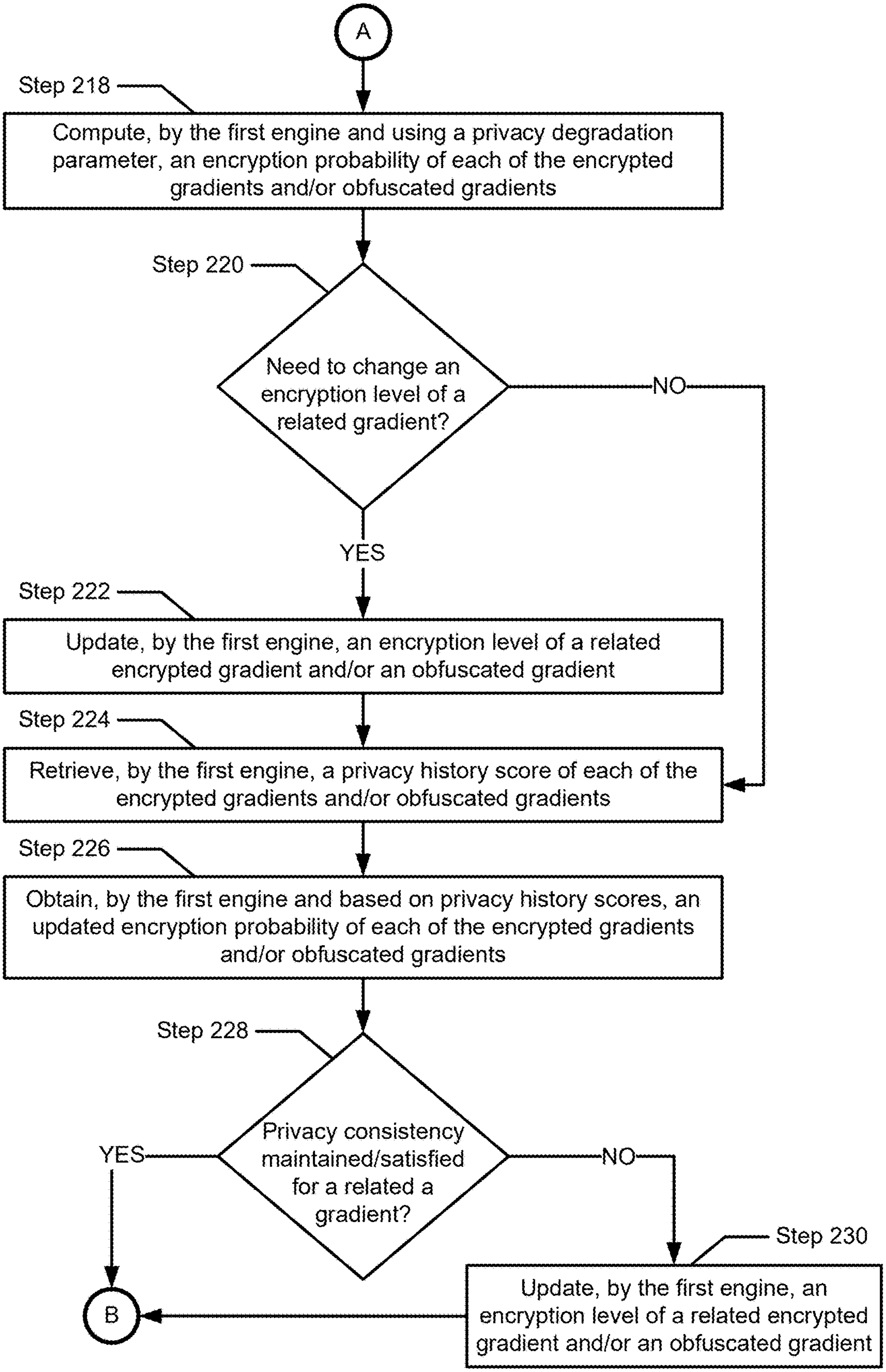
FIG. 2.2

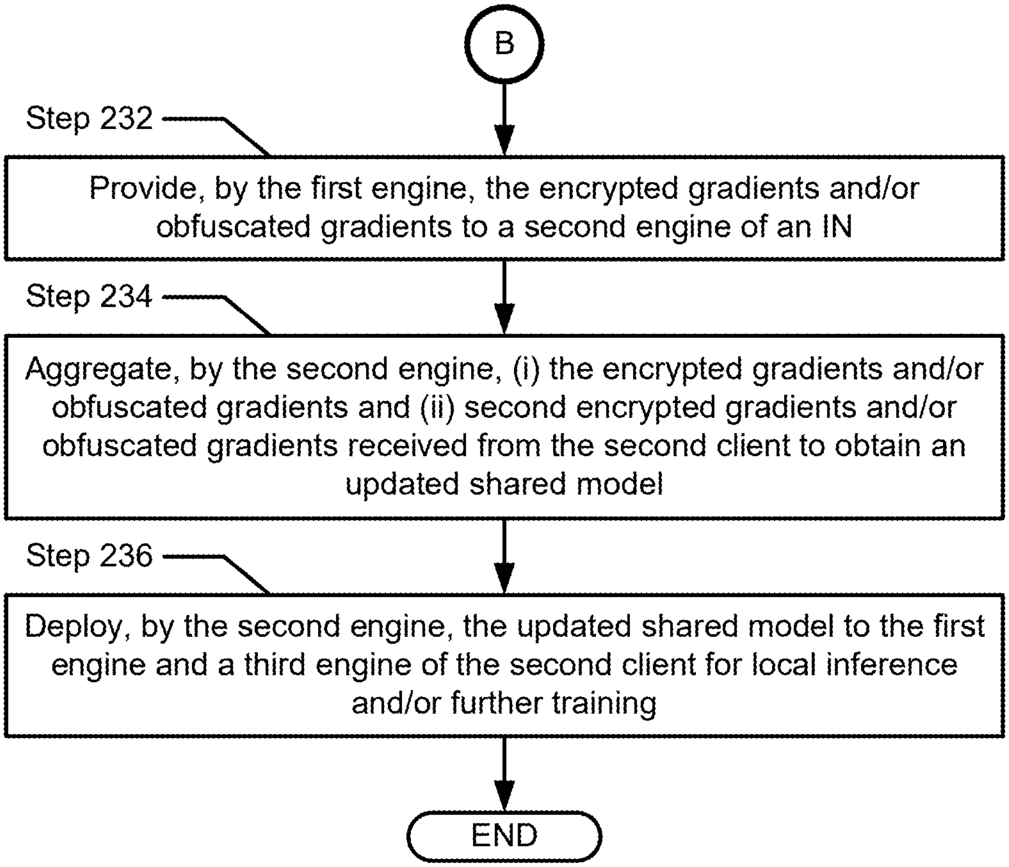
FIG. 2.3

DYNAMIC PRIVACY-CONSISTENT ENCRYPTION SYSTEM FOR FEDERATED LEARNING

BACKGROUND

The training of a machine learning (ML)/artificial intelligence (AI) model involves teaching the model to perform specific tasks by exposing the model to large datasets and iteratively adjusting the model's parameters to minimize errors. During training, the model processes input data, makes predictions, and/or compares those predictions to the actual outcomes using, for example, a loss function. Based on the loss, an optimization algorithm (e.g., a gradient descent algorithm) updates the model's parameters to improve the model's accuracy. This process is computationally intensive, particularly for deep learning models with millions or billions of parameters, and may take days or even weeks to complete, depending on the size and complexity of the model and datasets.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIGS. 2.1-2.3 show a method for managing a shared model in accordance with one or more embodiments disclosed herein.

DETAILED DESCRIPTION

Figure 1:
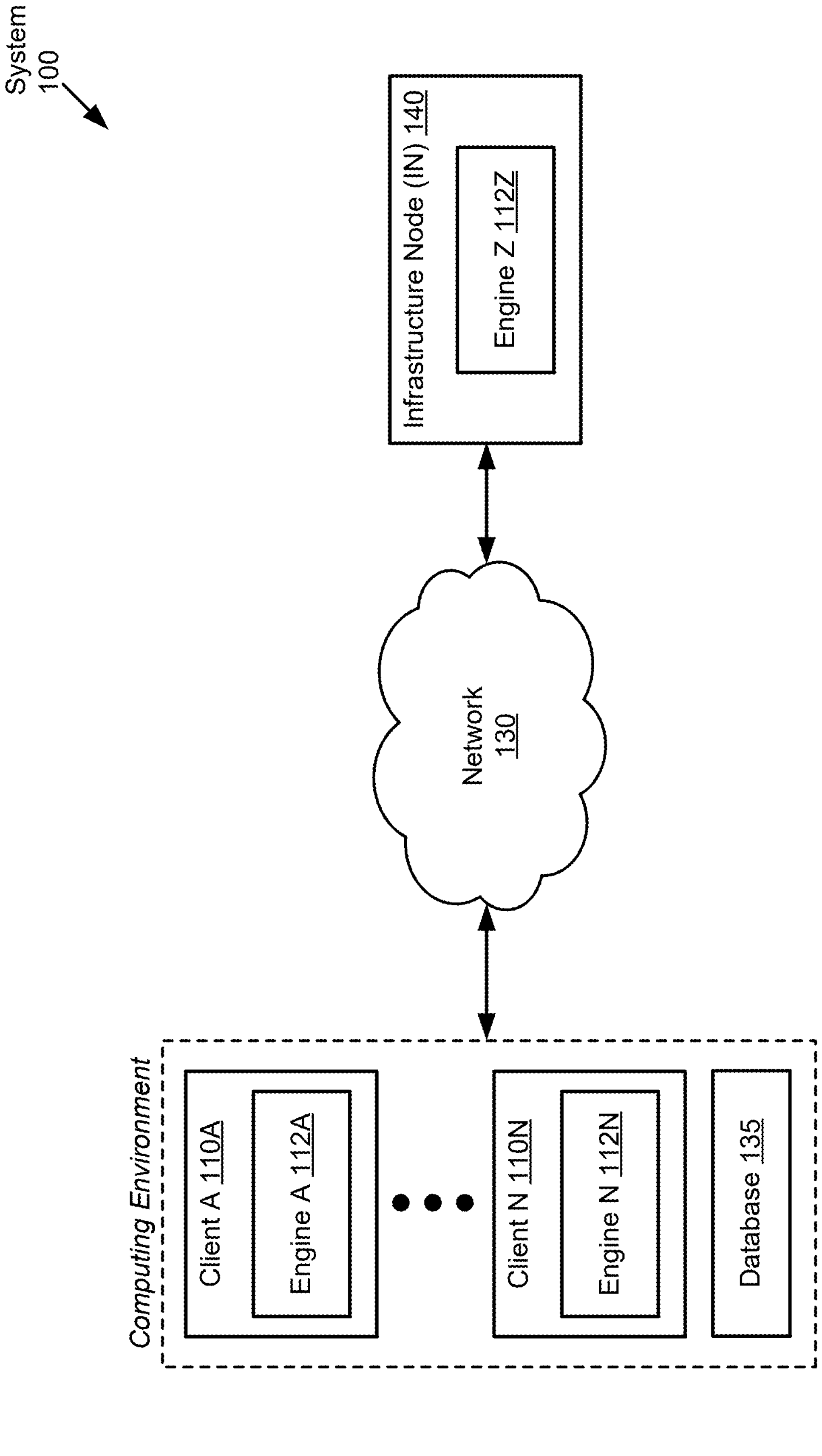
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e, any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Federated Learning (FL) is a distributed ML approach that enables multiple computing devices (or clients) to collaboratively train a shared model without sharing their raw data. This paradigm is important in privacy-sensitive domains such as healthcare, finance, and Internet of Things (IoT) networks. However, FL faces several challenges, including ensuring strong privacy protections for client data, managing computing resource constraints on edge devices, and maintaining scalability in diverse and dynamic environments.

Currently, there are several critical challenges in traditional FL systems. Some of these challenges are as follows: (i) High computational overhead of encryption: Traditional encryption methods (e.g., fully homomorphic encryption methods) impose excessive computational and communication costs, making these methods unsuitable for resource-constrained environments (e.g., IoT devices, edge networks, etc.). Thus, there is a need for an efficient encryption mechanism that selectively prioritizes critical model updates without sacrificing data and/or user privacy. (ii) Lack of dynamic adaptability to gradient sensitivity: Existing methods rely on static or heuristic approaches to determine which model updates should be encrypted. These methods are inadequate for dynamic environments where the sensitivity of gradients can change across model training iterations, leading to inefficiencies and potential privacy vulnerabilities. (iii) Inefficient privacy-utility trade-off mechanisms: Traditional FL approaches often fail to adaptively balance data privacy and efficiency. These approaches apply uniform encryption policies regardless of the risk level or computing resource constraints, resulting in either excessive privacy measures or compromised data protection. (iv) Inconsistent privacy across iterations: Privacy policies in many FL systems do not maintain consistency over model training iterations/rounds, leaving sensitive gradients exposed in certain model training rounds. This inconsistency undermines the robustness of privacy protection, particularly in high-stakes domains such as healthcare and finance.

As discussed above, FL is a distributed ML approach designed to preserve privacy by keeping data localized on computing devices. Despite its promise, several challenges persist. One of the earliest works on privacy preservation in ML introduced differential privacy mechanisms/methods to protect sensitive information during model training. While effective, these methods often degrade model utility by injecting noise, particularly in high-dimensional data scenarios.

Homomorphic encryption techniques emerged as a robust alternative to ensure privacy, enabling computations on encrypted data without decryption. However, their computational overhead proved prohibitive for real-time and resource-constrained systems, such as edge devices and IoT networks. To address this, selective encryption frameworks were introduced, which encrypt sensitive gradients identified through heuristic methods. However, the static nature of these heuristics' limits adaptability in dynamic environments.

Another significant limitation in traditional approaches is the lack of temporal consistency in privacy policies. Existing approaches often treat each model training iteration independently, leading to vulnerabilities and inefficiencies over time. This gap is particularly critical in applications such as healthcare and finance, where privacy must be consistent and adaptable to changing conditions.

While recent advancements have explored resource-aware differential privacy and scalable encryption mechanisms, no existing approach/framework integrates a flow-guided analysis to dynamically prioritize encryption based on gradient sensitivity and temporal coherence.

For at least the reasons discussed above and without requiring resource-intensive efforts (e.g., time, engineering, cost, utilization of excessive computing resources, etc.), a fundamentally different framework is needed (e.g., a dynamic, privacy-consistent encryption framework/system for FL that ensures privacy consistency while balancing computational efficiency).

Embodiments disclosed herein relate to methods and systems to manage a shared model. As a result of the processes discussed below, one or more embodiments disclosed herein advantageously ensure that: (i) the framework employs a gradient flow analysis to adaptively apply encryption based on the sensitivity and temporal behavior of model updates (where the framework introduces a flow-guided mechanism to adjust encryption levels dynamically, prioritizing privacy for critical gradients and ensuring coherence across model training iterations); (ii) to optimize computing resource usage, the framework employs an adaptive privacy degradation parameter ((a) where the parameter enables fine-grained control over the trade-off between encryption strictness and computational efficiency and (b), by this way, the framework remains practical for resource-constrained environments); (iii) the modular design of the framework makes the framework compatible with diverse FL architectures, requiring minimal integration efforts for users/customers; (iv) by incorporating temporal privacy coherence and real-time tuning, the framework provides a scalable, lightweight, and secure solution to address privacy challenges in FL (or in FL systems) (in this manner, the framework enhances the adaptability of FL systems, making those systems suitable for applications in sensitive industries such as healthcare, finance, and autonomous systems); (v) by analyzing the trajectory of model updates across model training iterations, the framework identifies and prioritizes the encryption of sensitive gradients while ensuring coherence in privacy policies over time (this approach ensures robust privacy protection without compromising computational efficiency); (vi) the framework ensures that (a) AI models can be trained across multiple organizations without exposing/sharing raw data (e.g., patient records, customer bank information, proprietary vehicle driving data, etc.), (b) the secure gradient encryption prevents adversaries from reconstructing sensitive model training information, and (c) the privacy degradation parameter balances computational efficiency with security, making FL scalable; (vii) the framework enables organizations to train (or fine-tune) AI/ML models across a distributed infrastructure while maintaining strict data privacy; and/or (viii) the framework provides built-in security for regulated industries (e.g., finance, healthcare, and/or government AI deployments), ensuring compliance with privacy laws.

In one or more embodiments, the core components/mechanisms of the framework may include: (i) Flow-guided encryption mechanism: This mechanism dynamically adjusts the level of encryption based on the sensitivity and temporal behavior of model updates. This mechanism focuses on encrypting critical gradients while minimizing the overhead on non-sensitive model updates. (ii) Privacy degradation parameter: This parameter allows fine-grained control over the trade-off between privacy enforcement and computational efficiency. Higher values prioritize resource efficiency, while lower values ensure stricter privacy protections. (iii) Temporal privacy coherence: The framework introduces a mechanism to ensure that privacy policies remain consistent across model training iterations. This mechanism prevents abrupt shifts in encryption strategies, which could compromise security or lead to inefficiencies. (iv) Modular design: The framework is designed to be plug-and-play, allowing seamless integration with existing FL architectures and compatibility with resource-constrained environments, such as edge devices and IoT systems.

By combining these components, the framework achieves a balance between privacy, efficiency, and adaptability. The framework provides a scalable and lightweight encryption system that ensures secure and privacy-preserving FL, even in dynamic and constrained environments. The framework may be particularly suited for applications requiring high levels of security and efficiency, such as real-time healthcare analytics, financial transactions, and autonomous systems.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.) and a database (135) in a computing environment (e.g., a user's computing environment, a specific computing environment of an organization, etc.), any number of infrastructure nodes (INs) (e.g., 140), and a network (130). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the database (135), the IN (140), and the network (130) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (140) are shown to be operatively connected through a communication network (e.g., 130), the clients (e.g., 110A, 110N, etc.) and the IN (140) may be directly connected (e.g., without an intervening communication network).

Further, the functioning of the clients (e.g., 110A, 110N, etc.) and the IN (140) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

In one or more embodiments, the clients (e.g., 110A, 110N, etc.) and the database (135) may be part of a computing environment (e.g., an internal information technology (IT) environment, users' site/environment, etc.). In one or more embodiments, the computing environment may be a data center or a virtual private cloud computing environment, associated with a user of a client (e.g., 110A).

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

As used herein, a "volume" may be analogous to a logical unit number in a storage area network (SAN), in which a volume may be a subset of the database's (135) capacity presented by a storage node of the storage as a local block device. A volume's data may be evenly distributed across all storage resources of the database (135), for example, according to a data layout selected for the database (135).

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, data deduplication, etc.), storage capacity (e.g., data backup), and data protection (e.g., software-defined data protection, disaster recovery, etc.) as a service to users (e.g., people, tenants, etc.) of clients (e.g., 110A, 110N, etc.). For example, the system (100) may be configured to organize unbounded, continuously generated data into a data stream. The system (100) may also represent a comprehensive middleware layer executing on computing devices (e.g., 300, FIG. 3) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (140)) from the users. By doing so, the users may utilize different computing devices (e.g., 300, FIG. 3) that have different quantities of computing resources (e.g., processing cycles, memory, storage, etc.) while still being afforded consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (140), the database (135), etc.), store, or otherwise utilize captured sensor data (and/or any other type and/or quantity of data), (iv) provide surveillance services (e.g., determining object-level information, performing face recognition, etc.) for scenes (e.g., a physical region of space), (v) initiate ML model training and/or ML model inferencing applications on one or more INs (e.g., 140), and/or (vi) monitor the status of the ML model training and/or receive the results of ML model inferencing applications. One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (140). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting/performing one or more workloads (for example, via the corresponding engine (e.g., Engine A (112A), Engine N (112N), etc.)), or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLA s) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or a computing device operated by one or more individuals of (or employed by) an organization. Examples of said individual(s) may include, but not limited to, any organization executive(s) (e.g., chief executive officer (CEO), chief financial officer (CFO), etc.), and any employee(s) in the accounting/finance team of the organization (e.g., a collector person). Further, the organization may refer to any enterprise at least engaged in for-profit commercial, industrial, or professional activities.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (140) and/or the database (135). For example, the clients may issue requests to the IN (140) to receive responses and interact with various components of the IN (140). The clients may also request data from and/or send data to the IN (140) (for example, the clients may transmit information to the IN that allows the IN to perform computations, the results of which are used by the clients to provide services to the users). As yet another example, the clients may utilize computer-implemented services provided by the IN (140). When the clients interact with the IN (140), data that is relevant to the clients may be stored (temporarily or permanently) in the IN (140).

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with the IN (140) and/or the database (135) that perform computations necessary to provide the computer-implemented services, (iv) using the computations performed by, for example, the IN (140) to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NV Me) device, a NVMe over Fabrics (NV Me-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (140), the database (135), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), RDMA, RDMA over Converged Ethernet (ROCE), IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an IP address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing Remote DMA ("RDMA"), e.g., RoCE to access data on another client, it may not be necessary to interact with the logical components of that client. Rather, when using RDMA, it may be possible for the networking resource to interact with the physical components of that client to retrieve and/or transmit data, thereby avoiding any higher level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to); a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be considered without departing from the scope of the embodiments disclosed herein.

Figure 3:
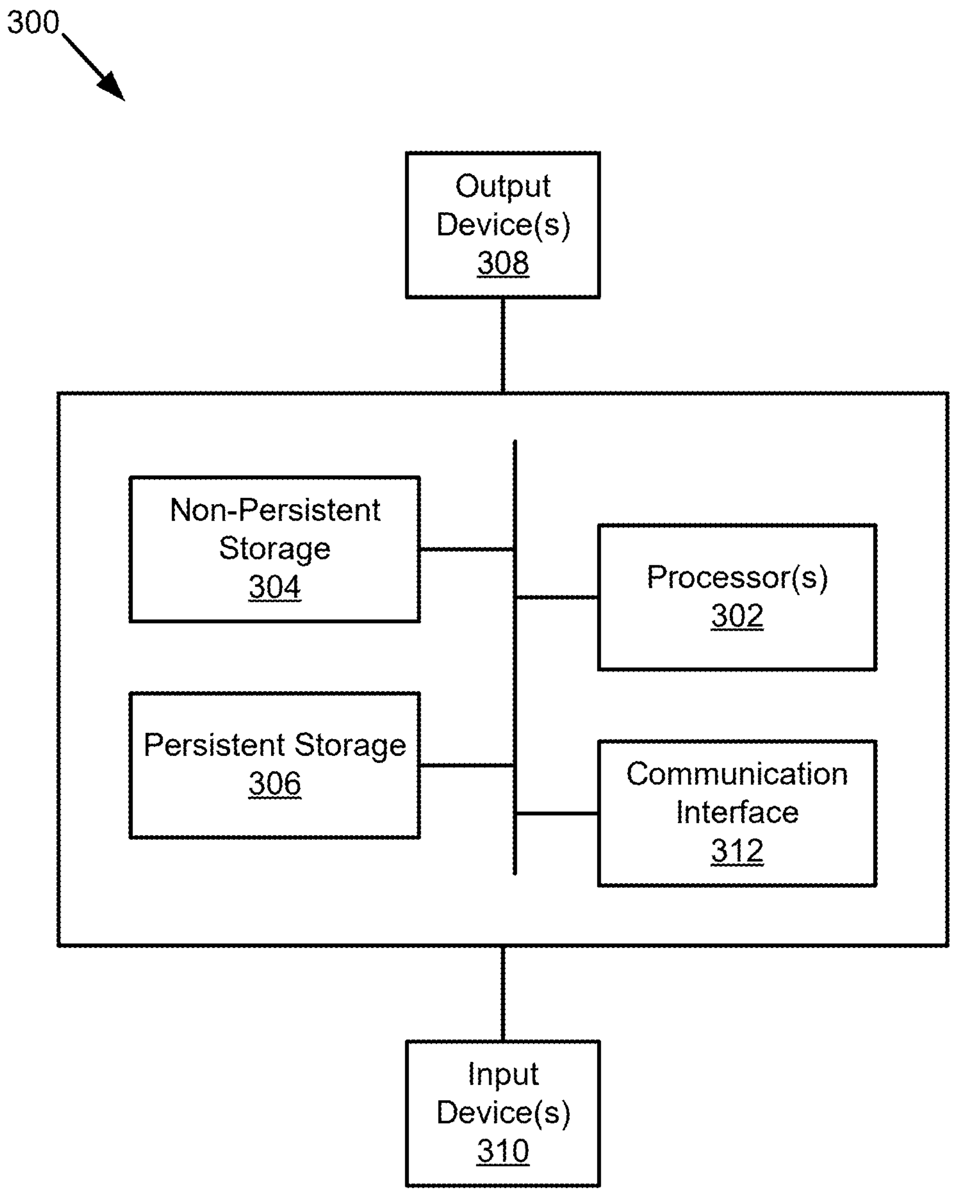
FIG. 3 shows a diagram of a computing device in accordance with one or more embodiments disclosed herein.

Further, in one or more embodiments, a client (e.g., 110A, 110N, etc.) may be implemented as a computing device (e.g., 300, FIG. 3). The computing device may be, for example, a desktop computer, a server, a distributed computing system, or a cloud resource. The computing device may include one or more processors, memory (e.g., RAM), GPUS, Neural Processing Units ("NPUs"), Tensor Processing Units ("TPUs"), and persistent storage (e.g., HDDs, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., administrators, organization executives, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing virtualization technology. In one or more embodiments, an administrator may be a user with permission (e.g., a user that has root-level access) to make changes to the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 300, FIG. 3) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (140) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (140), via its engine (Engine Z (112Z)), may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the storage for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing a set of linear, non-linear, and/or ML models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to a storage system (e.g., 135); (xv) provide (e.g., via a broadcast, multicast, or unicast mechanism) information (e.g., a location identifier, the amount of available resources, etc.) associated with the IN to other IN s of the system (100); (xvi) configure or control any mechanism that defines when, how, and what data to provide to the clients and/or to the storage system; (xvii) provide data deduplication to the clients; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (140) may communicate with, for example, the database (135) and/or other storage devices in the system (100).

One of ordinary skill will appreciate that Engine Z (112Z) may perform other functionalities without departing from the scope of the embodiments disclosed herein. In one or more embodiments, Engine Z (112Z) may be configured to perform all, or a portion, of the functionalities described in FIGS. 2.1-2.3. Engine Z (112Z) may be implemented as a computing device (e.g., a physical computing device, a logical computing device, etc.) using hardware (e.g., any number of integrated circuits for processing computer readable instructions, implemented on a corresponding entity's (e.g., 140) GPU(s), etc.), software (e.g., a computer program), or any combination thereof.

Separately, compared to Engine Z (112Z), Engine A (112A) and Engine N (112N) may perform additional, fewer, and/or different functionalities without departing from the scope of the embodiments disclosed herein. In one or more embodiments, Engine A (112A) and Engine N (112N) may be configured to perform all, or a portion, of the functionalities described in FIGS. 2.1-2.3. Each of Engine A (112A) and Engine N (112N) may be implemented as a computing device using hardware (e.g., any number of integrated circuits for processing computer readable instructions, implemented on a corresponding entity's (e.g., 110A, 110N, etc.) GPU(s), etc.), software (e.g., a computer program), or any combination thereof.

As described above, the IN (140) may be capable of providing a range of functionalities/services to the users of the clients (e.g., 110A, 110N, etc.). However, not all users may be allowed to receive all the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (140) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (140) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (140) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDM P) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of an SLA (or a rule) that applies to source data, identity of a target device where source data is to be stored, etc.

As used herein, the term "backup" is intended to be broad in scope. In this manner, example backups (in connection with which embodiments disclosed herein) may be employed include (but not limited to): full backups, partial backups, clones, snapshots, incremental backups, differential backups, etc.

As used herein, "data retention" is a period of time, with a definite start and end, within which the data should be retained in a database (e.g., 135). For example, a set of user requirements and/or technical considerations (e.g., security considerations, performance considerations, etc.) of a data center may be used to generate a data retention policy specifying that user data should be retained in the database for seven years.

As used herein, a "rule" is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

Further, while a single IN (e.g., 140) is considered above, the term "node" includes any collection of systems or sub-systems that individually or jointly execute a set, or multiple sets, of instructions to provide one or more computer-implemented services. For example, a single IN/server/host may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (140) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (140) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

Referring to FIG. 1, the clients (e.g., 110A, 110N, etc.) and the database (135) are demonstrated as part of a computing environment; however, embodiments disclosed herein are not limited as such. The database (135) may be demonstrated as part of the IN (140) (if the IN (140) is a secure environment). In one or more embodiments, the clients (e.g., 110A, 110N, etc.) and the database (135) may need to be hosted by the same computing/IT environment because of security concerns (where data (collected from the clients) have to be stored and analyzed (for any purpose) within the same environment as the clients).

In one or more embodiments, the IN (140) may be implemented as a computing device (e.g., 300, FIG. 3). The computing device may be, for example, a mobile phone, a tablet computer, a laptop computer, a desktop computer, a server, a distributed computing system, or a cloud resource. The computing device may include one or more processors, memory (e.g., RAM), GPUs, NPUs, TPUs, and persistent storage (e.g., HDDs, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (140) may also be implemented as a logical device.

Turning now to the database (135), the database (135) may provide long-term, durable, high read/write throughput data storage/protection with near-infinite scale and low-cost. The database (135) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. For example, the database (135) may store data (e.g., backup data; file system metadata; assets; rules and/or procedures for performing backups of the IN s; etc.). Further, the database (135) may also occupy a portion of a physical storage/memory device or, alternatively, may span across multiple physical storage/memory devices. The database (135) may include other and/or additional functionalities without departing from embodiments disclosed herein.

In one or more embodiments, the database (135) may be implemented using physical devices that provide data storage services (e.g., storing data and providing copies of previously stored data). The devices that provide data storage services may include hardware devices and/or logical devices. For example, the database (135) may include any quantity and/or combination of memory devices (i.e, volatile storage), long-term storage devices (i.e., persistent storage), other types of hardware devices that may provide short-term and/or long-term data storage services, and/or logical storage devices (e.g., virtual persistent storage/virtual volatile storage).

For example, the database (135) may include a memory device (e.g., a dual in-line memory device), in which data is stored and from which copies of previously stored data are provided. As yet another example, the database (135) may include a persistent storage device (e.g., an SSD), in which data is stored and from which copies of previously stored data is provided. As yet another example, the database (135) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (135) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (135) may store/log/record unstructured and/or structured data that may include (or specify), for example (but not limited to): a backup policy; telemetry data including past and present device usage of one or more computing devices (e.g., 110A, 110N, etc.); data for execution of applications/services including IN applications and associated end-points; corpuses of annotated data used to build/generate and train processing classifiers for trained ML models; linear, non-linear, and/or ML model parameters; data tags; an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; an identifier of a user (e.g., a unique string or combination of bits associated with a particular user) who initiated a backup (via a client); a distributed model identifier that uniquely identifies a distributed/shared ML model; a user activity performed on a data item; a cumulative history of user/administrator activity records obtained over a prolonged period of time; a setting (and a version) of a mission critical application executing on a client; configuration information associated with a client; a job detail of a job that has been initiated by a client; a type of the job (e.g., a non-parallel processing job, a parallel processing job, an analytics job, etc.); information associated with a hardware resource set (described below) of a client; a completion timestamp encoding a date and/or time reflective of the successful completion of a job; a time duration reflecting the length of time expended for executing and completing a job; a backup retention period associated with an asset (e.g., data item); a status of a job (e.g., how many jobs are still active, how many jobs are completed, etc.); a number of requests handled (in parallel) per minute (or per second, per hour, etc.) by a client; a number of errors encountered when handling a job (e.g., a backup process); a documentation that shows how a client performs against an SLO and/or an SLA; a set of requests received by a client; a set of responses provided (by the client) to those requests; information regarding an administrator (e.g., a high-priority trusted administrator, a low-priority trusted administrator, etc.) related to a job; tier/level information of a user (e.g., a high-privileged user, a low-privileged user, etc.); a geographic location (e.g., a country) associated with the user; a timestamp showing when a specific request is processed a client; computing resource details (including details of hardware components and/or software components) and an IP address of a client hosting an application where a specific request is processed; information with respect to historical metadata (e.g., system logs, applications logs, telemetry data including past and present device usage of one or more computing devices in the system (100), etc.); computing resource details and an IP address of a client that sent a specific request (e.g., to an IN); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; data used for ML model training (e.g., a shared ML model training) and/or ML inferencing; etc.

In one or more embodiments, information associated with a hardware resource set (e.g., including at least resource related parameters) may specify, for example (but not limited to): a configurable CPU option (e.g., a valid/legitimate vCPU count for a client), a configurable network resource option (e.g., enabling/disabling single-root input/output virtualization (SR-IOV) for the client), a configurable memory option (e.g., maximum and minimum memory for the client), a configurable GPU option (e.g., allowable scheduling policy and/or virtual GPU (vGPU) count combinations for the client), a configurable DPU option (e.g., legitimacy of disabling inter-integrated circuit (I2C) for the client), a configurable storage space option (e.g., a list of disk cloning technologies across one or more clients in the system (100)), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QoS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per client in the system (100), a wake on LAN support configuration (e.g., supported/enabled, not supported/disabled, etc.), a vGPU count per client in the system (100), a type of a vGPU scheduling policy (e.g., a "fixed share" vGPU scheduling policy), a storage mode configuration (e.g., an enabled high-performance storage array mode), etc.

In one or more embodiments, metadata (e.g., system logs, application logs, etc.) may be obtained (or dynamically fetched) as they become available (e.g., with no user manual intervention), or by a module (not shown) of the database (135) polling a corresponding client (e.g., 110A) (by making schedule-driven/periodic application programming interface (API) calls to the client without affecting the client's ongoing production workloads) for newer metadata, for example, before analyzing a health state of the client. Based on receiving the API calls from the module, the client may allow the module to obtain the metadata.

In one or more embodiments, the metadata may be obtained (or streamed) continuously as they generated, or they may be obtained in batches, for example, in scenarios where (i) the module of the database (135) receives a metadata analysis request (or a health state check request for a client), (ii) another client of the system (100) accumulates the metadata and provides them to the module at fixed time intervals, or (iii) a storage device (not shown) in the system (100) stores the metadata and notify the module to access the metadata from the storage device. In one or more embodiments, metadata may be access-protected for a transmission from the storage device to the module, e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database (135), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) and/or by the administrators based on, for example, newer (e.g., updated) versions of external information. The unstructured and/or structured data may also be updated when, for example (but not limited to): a set of newer backup rules is received, an ongoing backup process is fully completed, a state of a client (e.g., 110A) is changed, etc.

While the database (135) has been illustrated and described as including a limited number and type of data, the database (135) may store additional, less, and/or different data without departing from the scope of the embodiments disclosed herein. One of ordinary skill will appreciate that the database (135) may perform other functionalities without departing from the scope of the embodiments disclosed herein.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, the database, etc.). As discussed above, components of the system (100) may operatively connect to one another through the network (e.g., a SAN, a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the INs through any number and type of wired and/or wireless network protocols (e.g., TCP, UDP, IPV4, etc.).

The network (130) may encompass various interconnected, network-enabled subcomponents (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents (e.g., network devices) may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

While FIG. 1 shows a configuration of components, other system configurations may be used without departing from the scope of the embodiments disclosed herein.

In one or more embodiments, the framework/system (100) employs a step-by-step approach for dynamic, privacy-consistent encryption in FL. The framework focuses on solving the challenges of balancing privacy and efficiency, ensuring temporal privacy coherence, and enabling scalability in resource-constrained environments.

FIGS. 2.1-2.3 show a method for managing a shared model (e.g., a shared ML model, a shared pretrained ML model, etc.) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 2.1, the method shown in FIG. 2.1 may be executed by, for example, the above-discussed engine (e.g., 112A, FIG. 1) of a client (e.g., 110A, FIG. 1) and database (e.g., 135, FIG. 1). Other components of the system (100) illustrated in FIG. 1 may also execute all or part of the method shown in FIG. 2.1 without departing from the scope of the embodiments disclosed herein.

In Step 200, the engine (e.g., the first engine) of the client (e.g., the first client) provides a first dataset of the first client to the database, in which the database may include, at least, the first dataset and a second dataset of a second client (e.g., 110N, FIG. 1). In one or more embodiments, the first dataset (e.g., the first telemetry data) may include (or specify), for example (but not limited to): health information of a computing device (e.g., a storage device) of the first client (e.g., storage device health metrics such as read/write latency, one or more detected bad sectors, I/O throughput, etc.), efficiency information of a workload being performed on the first client (e.g., an IoT device), energy consumption information of a second computing device of the first client while performing the workload (e.g., electric power used by Engine A (e.g., 112A, FIG. 1) over a period of time), temperature information of the computing device (that is obtained in real-time from one or more temperature sensors of the client), computing resource utilization information (e.g., real-time CPU usage information, real-time GPU usage information, real-time memory allocation for executing a specific workload, etc.) related to the client, an identifier of the first client, a timestamp indicating when the first dataset is provided to the database, etc.

In one or more embodiments, data (e.g., the first dataset, the second dataset, etc.) that are generated/collected by any client may need to remain local (within users' computing environment, see FIG. 1) to ensure privacy while being processed for FL. In this manner, the collected data (at each client) may be stored in/to the database (e.g., an SQLite relational database) using a structured schema, in which the schema may ensure that the data is structured for an efficient gradient computation in the next step(s).

In Step 202, upon receipt of the first dataset and by employing a set of linear, non-linear, and/or ML models (and once the first dataset is stored to the database), the database performs preprocessing (or preprocessing operations such as data normalization, feature engineering, etc.) on the first dataset to obtain preprocessed data. In Step 204, the database provides the preprocessed data to the first engine of the first client. In one or more embodiments, the first client may store the preprocessed data in its storage/memory resources (to make the preprocessed data ready for use in local "shared" ML model training).

In Step 206, by employing an algorithm (e.g., the stochastic gradient descent algorithm), the first engine trains the shared ML model (e.g., a local ML model, a logistic regression model, etc.) using the preprocessed data (e.g., its preprocessed telemetry data) as the input to predict, for example, whether the first client is operating optimally (or as expected) or is requiring an intervention/attention (e.g., to fix the unhealthy status of the client). As used herein, "unhealthy" may refer to a compromised health state (e.g., an unhealthy state), indicating that a corresponding entity (e.g., a hardware component, a client, an application, etc.) has already or is likely to, in the future, be no longer able to provide the services that the entity has previously provided. The health state determination may be made via any method based on the aggregated health information of the corresponding entity without departing from the scope of the embodiments disclosed herein.

In Step 208, as a result of (or based on) the training, the first engine obtains/computes a set of gradients (e.g., model updates) for a set of parameters of the shared ML model (that would eventually be shared with a second engine (e.g., 112Z, FIG. 1) of the IN (e.g., 140, FIG. 1). In one or more embodiments, the set of parameters may include weights and biases associated with the shared ML model. Further, the set of gradients may represent how the set of parameters should be updated to improve prediction accuracy of the shared ML model and/or may represent how much each feature (e.g., input variables to the shared ML model) contributes to improving the first client's health classification/determination. For example, if the gradient for "Disk Health Score" is positive and high, the gradient may suggest that the disk health strongly influences the prediction of optimal first client performance, making this gradient a potential candidate for encryption in Step 214.

An example set of gradients may specify: "{"Weight Gradients": {"CPU Utilization Scaled": −0.0032, "Memory Usage Scaled": −0.0025, "Disk Health Score": 0.0048, "Energy Scaled": −0.0019, "Temperature Scaled": 0.0007}, "Bias Gradient": 0.0015}. The set of gradients may then be stored (temporarily) in/to storage/memory resources of the first client, in which the set of gradients may be structured in a schema compatible with the flow-guided encryption mechanism/framework (see Step 210).

In Step 210, based on a second set of gradients for the set of parameters and by employing the flow-guided encryption mechanism/framework (e.g., to prioritize encryption for critical gradients in order to ensure robust privacy protection while minimizing computational and communication overhead), the first engine analyzes the set of gradients to obtain a gradient flow for each of the set of gradients (e.g., over multiple model iterations). In one or more embodiments, the second set of gradients may be obtained from a second training of the shared ML model, in which the second training is performed before the training.

In one or more embodiments, Step 210 may be performed to, at least: (i) identify critical gradients that require stronger encryption due to their sensitivity; (ii) use a flow analysis to determine the "trajectory" of gradient updates over multiple model iterations; and (iii) apply selective homomorphic encryption for critical gradients (see Step 214) and lightweight obfuscation techniques (e.g., scrambling or noise injection) for non-critical gradients (see Step 216).

As used herein, a "gradient flow" may refer to the trajectory of a gradient value across multiple model training iterations. Mathematically, the flow of a gradient for a feature (f) can be modeled as the change in its value between two consecutive iterations:

$$\text{Flow}_f^{(t)} = \nabla_f^{(t)} - \nabla_f^{(t-1)}$$

where $$\nabla_f^{(t)} \tag{i}$$

is the gradient value of feature (f) at iteration (t) and $$\nabla_f^{(t-1)} \tag{ii}$$

is the gradient value of feature (f) at iteration (t−1). The magnitude of this flow determines the sensitivity of the gradient:

$$\left|\text{Flow}_f^{(t)}\right| = \left|\nabla_f^{(t)} - \nabla_f^{(t-1)}\right|.$$

In Step 212, based on the gradient flow for each of the set of gradients, the first engine makes a first determination (in real-time or near real-time) as to whether a related gradient is critical/sensitive. Accordingly, in one or more embodiments, if the result of the first determination is YES, the method proceeds to Step 214. If the result of the first determination is NO, the method alternatively proceeds to Step 216.

In one or more embodiments, gradients with high-flow magnitudes may be classified as critical gradients. A threshold (t) may be used to determine the criticality of a related gradient:

$$\text{Critical}_f = \begin{cases} 1 & \text{if } \left|\text{Flow}_f^{(t)}\right| \geq \tau \\ 0 & \text{otherwise} \end{cases}$$

where threshold (τ) may be dynamically adjusted based on the first client's requirements (e.g., computing resource utilization requirements).

In Step 214, as a result of the first determination in Step 212 being YES, the first engine applies homomorphic encryption on sensitive/critical gradients ($\text{Critical}_f=1$) of the set of gradients to obtain encrypted gradients (and to ensure secure computation on encrypted data). For example, a critical gradient $$\nabla_f^{(t)} = -0.0032$$

is encrypted as:

$$\text{Encrypted}_f = E\left(\nabla_f^{(t)}\right),$$

where E is the encryption function. Following Step 214, the method proceeds to Step 218 of FIG. 2.2.

In Step 216, as a result of the first determination in Step 212 being NO, the first engine applies obfuscation (e.g., scrambling, differential privacy noise, etc.) on non-sensitive gradients ($\text{Critical}_f=0$) of the set of gradients to obtain obfuscated gradients. To apply/perform obfuscation, the first engine may use the following equation:

$$\text{Obfuscated}_f = \nabla_f^{(t)} + \mathcal{N}(0, \sigma^2),$$

where $\mathcal{N}(0,\sigma^2)$) is Gaussian noise with mean (0) and variance ($\sigma^2$). Following Step 216, the method proceeds to Step 218 of FIG. 2.2.

In view of Steps 214 and 216, consider the following example gradients computed for features: {"CPU Utilization": −0.0032, "Memory Usage": −0.0025, "Disk Health Score": 0.0048, "Energy": −0.0019, and "Temperature": 0.0007}. Assume an example scenario that the flow magnitudes across iterations are calculated as: {"CPU Utilization": 0.005, "Memory Usage": 0.002, "Disk Health Score": 0.006, "Energy": 0.001, and "Temperature": 0.0004}. With a threshold (t=004), the critical gradients are: {"CPU Utilization": Critical and "Disk Health Score": Critical}. In view of this, the critical gradients are encrypted: {"CPU Utilization": E(−0.0032) and "Disk Health Score": E(0.0048)} and the non-critical gradients are obfuscated: {"Memory Usage": −0.0025+Noise, "Energy": −0.0019+Noise, and "Temperature": 0.0007+Noise}. As a result, the output of Steps 214 and 216 may include encrypted critical gradients and obfuscated non-critical gradients, structured as: {"CPU Utilization": Encrypted, "Disk Health Score": Encrypted, "Memory Usage": Obfuscated, "Energy": Obfuscated, and "Temperature": Obfuscated}.

Turning now to FIG. 2.2, the method shown in FIG. 2.2 may be executed by, for example, the first engine. Other components of the system (100) illustrated in FIG. 1 may also execute all or part of the method shown in FIG. 2.2 without departing from the scope of the embodiments disclosed herein.

In Step 218, based on Steps 214 and 216, the first engine, using a privacy degradation parameter ($\gamma$), computes an encryption probability of each of the encrypted gradients and/or obfuscated gradients. In one or more embodiments, the privacy degradation parameter ($\gamma$) may be applied/used to dynamically adjust the balance between encryption strictness and computational efficiency. By tuning ($\gamma$), the first engine may adapt to resource constraints and privacy requirements.

In one or more embodiments, the privacy degradation parameter ($\gamma$) determines the proportion of gradients that receive strict encryption. A lower ($\gamma$) enforces stricter privacy, encrypting most gradients, while a higher ($\gamma$) prioritizes efficiency, reducing encryption and relying more on lightweight obfuscation. The probability of applying encryption to a gradient is inversely proportional to ($\gamma$). For a given feature (f), the encryption probability is calculated as: $P(\text{Encrypt}_f)=e^{-\gamma\cdot|Flow_f|}$ where (i) $|Flow_f|$ is the gradient flow magnitude for feature (f) and (ii) ($\gamma$) is the privacy degradation parameter ($\gamma>0$).

More specifically, for each gradient, the following steps may be performed:

(i) the encryption probability is calculated using $P(\text{Encrypt}_f)=e^{-\gamma\cdot|Flow_f|}$ (ii) a random value ($r\in[0,1]$) is selected and this value is compared with $P(\text{Encrypt}_f)$:

$$\text{Decision}_f=\begin{cases}\text{Encrypt if } r\le P(\text{Encrypt}_f)\\ \text{Obfuscate otherwise}\end{cases}$$

Continuing with the discussion of the example scenario, assume that $\gamma$=50. In view of this, the first engine may compute $P(\text{Encrypt}_f)$ for each gradient as:

$$P(\text{Encrypt}_{CPU\ Utilization})=e^{-50\cdot0.005}\approx0.7788, \quad \text{(i)}$$

$$P(\text{Encrypt}_{Memory\ Usage})=e^{-50\cdot0.002}\approx0.9048, \quad \text{(ii)}$$

$$P(\text{Encrypt}_{Disk\ Health\ Score})=e^{-50\cdot0.006}\approx0.7408, \quad \text{(iii)}$$

$$P(\text{Encrypt}_{Energy})=e^{-50\cdot0.001}\approx0.9512, \quad \text{(iv)}$$

$$P(\text{Encrypt}_{Temperature})=e^{-50\cdot0.001}\approx0.9802. \quad \text{(v)}$$

Thereafter, for each gradient, the first engine (i) compares the following random value(s) with $P(\text{Encrypt}_f)$: {"CPU Utilization": 0.6, "Disk Health Score": 0.8, "Memory Usage": 0.9, "Energy": 0.5, and "Temperature": 0.2} and (ii) makes the following encryption decisions: {"CPU Utilization": Encrypt, "Disk Health Score": Obfuscate, "Memory Usage": Obfuscate, "Energy": Encrypt, and "Temperature": Encrypt}. Based on the decisions, the output of Step 218 may include the following encrypted or obfuscated gradients (which would be evaluated for a temporal privacy coherence): {"CPU Utilization": Encrypted, "Disk Health Score": Obfuscated, "Memory Usage": Obfuscated, "Energy": Encrypted, and "Temperature": Encrypted}.

In Step 220, based on Step 218, the first engine makes a second determination (in real-time or near real-time) as to whether an encryption level of a related gradient (e.g., an encrypted gradient, an obfuscated gradient, etc.) needs to be updated/changed. Accordingly, in one or more embodiments, if the result of the second determination is YES, the method proceeds to Step 222. If the result of the second determination is NO, the method alternatively proceeds to Step 224.

In Step 222, as a result of the second determination in Step 220 being YES, the first engine updates an encryption level of a related encrypted gradient and/or an obfuscated gradient. In Step 224, as a result of the second determination in Step 220 being NO or after Step 222, the first engine retrieves a privacy history score of each of the encrypted gradients and/or obfuscated gradients from, for example, the database or the storage/memory resources of the first client. In Step 226, based on privacy history scores (retrieved in Step 224), the first engine obtains an updated encryption probability of each of the encrypted gradients and/or obfuscated gradients.

In Step 228, based on Step 226 (e.g., based on the updated encryption probability of each of the encrypted gradients and/or obfuscated gradients), the first engine makes a third determination (in real-time or near real-time) as to whether an encryption level of a related gradient (e.g., an encrypted gradient, an obfuscated gradient, etc.) is correct (e.g., privacy consistency maintained/satisfied for a related gradient). Accordingly, in one or more embodiments, if the result of the third determination is YES, the method proceeds to Step 232 of FIG. 2.3. If the result of the third determination is NO, the method alternatively proceeds to Step 230.

In Step 230, as a result of the third determination in Step 228 being NO, the first engine updates an encryption level of a related encrypted gradient and/or an obfuscated gradient. After Step 230, the method alternatively proceeds to Step 232 of FIG. 2.3.

In view of Steps 220-230, the first engine may ensure that encryption and obfuscation decisions remain consistent across model training iterations for sensitive/critical gradients. In one or more embodiments, temporal privacy coherence is critical in scenarios where sensitive gradients may exhibit fluctuating flows but consistently require strong privacy protections. More specifically, temporal privacy coherence ensures that gradients identified as "critical" in earlier iterations remain protected in subsequent model iterations, even if these gradients' immediate sensitivities (e.g., flow magnitudes) drop. This consistency is achieved by maintaining a record of historical encryption decisions and integrating the record into current encryption probabilities.

More specifically, for each for gradient/feature (f), the first engine defines a privacy history score $$H_f^{(t)}$$

that accumulates its historical sensitivity across iterations:

$$H_f^{(t)} = \alpha \cdot H_f^{(t-1)} + (1-\alpha) \cdot |\text{Flow}_f^{(t)}|,$$

where:

$$H_f^{(t)} \quad \text{(i)}$$

represents a privacy history score for gradient (f) at iteration (t), (ii) α represents a smoothing factor (0≤α≤1) controlling the influence of historical data, and $$|\text{Flow}_f^{(t)}| \quad \text{(iii)}$$

represents a now magnitude of gradient (f) at iteration (t). In this manner, the updated encryption probability becomes:

$$P(\text{Encrypt}_f) = e^{-\gamma \cdot H_f^{(t)}}.$$

This ensures that gradients with consistently high $$H_f^{(t)}$$

values are prioritized for encryption.

As indicated above, first, the first engine initializes privacy history as following: For the first iteration $$(t = 0),\ \text{set}(H_f^{(0)} = |\text{Flow}_f^{(0)}|).$$

Thereafter, the first engine updates the privacy history as following: For each subsequent iteration, calculate $$H_f^{(t)}.$$

Then, the first engine adjusts/updates the encryption probability of each gradient as following: Use $$H_f^{(t)}$$

to calculate $P(\text{Encrypt}_f)$ and decide performing encryption or obfuscation on each gradient.

Continuing with the discussion of the example scenario, assume that α=0.8. In view of this, the initial privacy history (t=0) can be defined as: {"CPU Utilization": 0.005, "Disk Health Score": 0.006, "Memory Usage": 0.002, "Energy": 0.001, and "Temperature": 0.0004}. For an iteration (t=1), newer flow magnitudes can be defined as: {"CPU Utilization": 0.004, "Disk Health Score": 0.007, "Memory Usage": 0.003, "Energy": 0.002, and "Temperature": 0.0005}. Thereafter, the first engine may update the privacy history as follows:

$$H_{CPU\ Utilization}^{(1)} = 0.8 \cdot 0.005 + 0.2 \cdot 0.004 = 0.0048, \quad \text{(i)}$$

$$H_{Memory\ Usage}^{(1)} = 0.8 \cdot 0.002 + 0.2 \cdot 0.003 = 0.0022, \quad \text{(ii)}$$

$$H_{Disk\ Health\ Space}^{(1)} = 0.8 \cdot 0.006 + 0.2 \cdot 0.007 = 0.0062, \quad \text{(iii)}$$

$$H_{Energy}^{(1)} = 0.8 \cdot 0.001 + 0.2 \cdot 0.002 = 0.0012, \quad \text{(iv)}$$

$$H_{Temperature}^{(1)} = 0.8 \cdot 0.0004 + 0.2 \cdot 0.0005 = 0.00042 \quad \text{(v)}$$

The newer encryption probabilities (γ=50) are calculated as follows:

$$P(\text{Encrypt}_{CPU\ Utilization}) = e^{-50 \cdot 0.0048} \approx 0.7827, \quad \text{(i)}$$

$$P(\text{Encrypt}_{Memory\ Usage}) = e^{-50 \cdot 0.0022} \approx 0.8944, \quad \text{(ii)}$$

$$P(\text{Encrypt}_{Disk\ Health\ Score}) = e^{-50 \cdot 0.0062} \approx 0.7408. \quad \text{(iii)}$$

Assuming the following random values for encryption decisions: {"CPU Utilization": 0.6, "Disk Health Score": 0.7, "Memory Usage": 0.9, "Energy": 0.5, and "Temperature": 0.3}. Thereafter, the first engine may perform the following decision (based on each gradient's $P(\text{Encrypt}_f)$): {"CPU Utilization": Encrypt, "Disk Health Score": Encrypt, "Memory Usage": Obfuscate, "Energy": Obfuscate, and "Temperature": Encrypt}. As a result, the output of Steps 220-230 may include encrypted gradients and obfuscated gradients with consistency ensured sensitive gradients: {"CPU Utilization": Encrypted, "Disk Health Score": Encrypted, "Memory Usage": Obfuscated, "Energy": Obfuscated, and "Temperature": Encrypted}.

Turning now to FIG. 2.3, the method shown in FIG. 2.3 may be executed by, for example, the first engine (of the first client) and the second engine (of the IN). Other components of the system (100) illustrated in FIG. 1 may also execute all or part of the method shown in FIG. 2.3 without departing from the scope of the embodiments disclosed herein.

In Step 232, after Step 228 (e.g., based on the third determination) or Step 230, the first engine provides the encrypted gradients and/or obfuscated gradients to the second engine. In Step 234, by employing a set of linear, non-linear, and/or ML models, the second engine aggregates (i) the encrypted gradients and/or obfuscated gradients and (ii) second/other encrypted gradients and/or obfuscated gradients received from the second client to obtain an updated shared ML model. This ensures that the contributions of all participating clients are reflected in the "updated" shared ML model without exposing sensitive data/dataset of each client. For example, the updated shared model is obtained without exposing the first dataset to the second engine.

In one or more embodiments, the second engine may receive encrypted gradients for sensitive features and obfuscated gradients for non-sensitive features from each client. Using any suitable secure aggregation technique, the second engine may compute the average (or weighted average) of gradients for each feature to update the shared ML model. For encrypted gradients, homomorphic encryption may allow aggregation directly on the encrypted values without decryption.

For example, assume here that Client A has provided {"CPU Utilization": Encrypted (–0.0032), "Disk Health Score": Encrypted (0.0048), "Memory Usage": Obfuscated (–0.002), "Energy": Obfuscated (–0.001), and "Temperature": Encrypted (0.0007)} and Client B has provided {"CPU Utilization": Encrypted (–0.0040), "Disk Health Score": Encrypted (0.0052), "Memory Usage": Obfuscated (–0.0025), "Energy": Obfuscated (–0.0015), and "Temperature": Encrypted (0.0006)}.

In this example, (a) for encrypted gradients, the second engine may perform a homomorphic addition as:

$$E\left(\nabla^{global}_{CPU\ Utilization}\right) = E(-0.0032) + E(-0.0040),$$

and (b) for obfuscated gradients, the second engine may perform the addition directly:

$$E\left(\nabla^{global}_{Memory\ Usage}\right) = -0.002 + (-0.0025) = -0.0045.$$

Thereafter, the second engine may decrypt the aggregated gradients as:

$$D\left(E\left(\nabla^{global}_{CPU\ Utilization}\right)\right) = D(E(-0.0032) + E(-0.0040)) = -0.0072.$$

As a result, the aggregated gradients for all the features are: {"CPU Utilization": –0.0072, "Disk Health Score": 0.01, "Memory Usage": –0.0045, "Energy": –0.0025, and "Temperature": 0.0013}. The second engine may then use these aggregated gradients to update the global model parameters ($W^{global}$): $W^{global}=W^{global}-\eta\cdot\nabla^{global}$, where n is the learning rate.

In Step 236, the second engine deploys the updated shared ML model to the first engine and, at least, a third engine of the second client for local inference workloads (or local operations) and/or further training (or fine-tuning) workloads. For example, the first engine (of the first client) may use the updated shared ML model to predict whether the current operating state (or the current health) of the first client is "Optimal/Healthy" or "Degraded/Unhealthy" based on newer telemetry data of the first client. In this manner, each client benefits from the collective intelligence of the FL process while maintaining data privacy (e.g., without exposing individual client data). In one or more embodiments, the updated shared ML model may be represented as a set of updated model parameters (e.g., weights). Each client may store locally the set of updated model parameters. In one or more embodiments, the method may end following Step 236.

As discussed above, the system/framework (e.g., 100, FIG. 1) provides the flow-guided encryption mechanism, which introduces a dynamic, data-driven approach to prioritizing encryption. Unlike static or heuristic-based methods, this mechanism continuously analyzes the flow of gradients over time, calculating their sensitivity based on changes between iterations. This ensures that encryption resources are focused on critical gradients, providing better privacy guarantees with significantly lower overhead.

By using temporal flow analysis, the system: (i) dynamically adapts encryption priorities based on real-time gradient behavior, (ii) track temporal patterns in gradient sensitivity, ensuring consistent protection for critical updates, and/or (iii) reduces unnecessary encryption of low-sensitivity gradients, improving efficiency in resource-constrained systems.

Further, the system/framework employs the privacy degradation parameter, which enables fine-grained control over the balance between privacy and computational efficiency in FL. By tuning this parameter, the system can dynamically adjust encryption and obfuscation levels to adapt to varying resource constraints and privacy requirements.

The privacy degradation parameter introduces a new paradigm by dynamically tuning privacy levels using a probabilistic approach. For each gradient, the probability of encryption is determined based on its sensitivity and the current value of the privacy degradation parameter ((Y)) This allows the system to: (i) encrypt highly sensitive gradients while obfuscating fewer sensitive ones to save computational/computing resources, (ii) adapt to real-time resource constraints, such as limited CPU or memory availability, on clients (e.g., edge devices), and (iii) provide flexible control to users/administrators, allowing them to adjust (Y) based on specific application requirements (e.g., stricter privacy for healthcare data vs. relaxed settings for IoT data).

Turning now to FIG. 3, FIG. 3 shows a diagram of a computing device in accordance with one or more embodiments disclosed herein.

In one or more embodiments disclosed herein, the computing device (300) may include one or more computer processors (302), non-persistent storage (304) (e.g., volatile memory, such as RAM, cache memory), persistent storage (306) (e.g., a non-transitory computer readable medium, a hard disk, an optical drive such as a CD drive or a DVD drive, a Flash memory, etc.), a communication interface (312) (e.g., Bluetooth interface, infrared interface, network interface, optical interface, etc.), an input device(s) (310), an output device(s) (308), and numerous other elements (not shown) and functionalities. Each of these components is described below.

In one or more embodiments, the computer processor(s) (302) may be an integrated circuit for processing instructions. For example, the computer processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (e.g., a LAN, a WAN, Internet, mobile network, etc.) and/or to another device, such as another computing device.

In one or more embodiments, the computing device (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a shared model, the method comprising:
- providing, by a first engine of a first client, a first dataset of the first client to a database;
- performing, by the database, preprocessing on the first dataset to obtain preprocessed data;
- providing, by the database, the preprocessed data to the first engine;
- training, by the first engine, the shared model using the preprocessed data;
- obtaining, by the first engine and based on the training, a set of gradients for a set of parameters of the shared model;
- analyzing, by the first engine and based on a second set of gradients for the set of parameters, the set of gradients to obtain a gradient flow for each of the set of gradients,
  - wherein the second set of gradients is obtained from a second training of the shared model, wherein the second training is performed before the training;
- based on the gradient flow for each of the set of gradients and by the first engine:
  - applying homomorphic encryption on sensitive gradients of the set of gradients to obtain encrypted gradients (EGs),
  - applying obfuscation on non-sensitive gradients of the set of gradients to obtain obfuscated gradients (OGs);
- computing, by the first engine and using a privacy degradation parameter, an encryption probability of each of the EGs and the OGs;
- making, by the first engine and based on the computing, a first determination that an encryption level of an EG of the EGs needs to be updated;
- updating, by the first engine and based on the first determination, the encryption level of the EG to an OG;
- retrieving, by the first engine and based on the updating, a privacy history score of each of the EGs and the OGs;
- obtaining, by the first engine and based on privacy history scores, an updated encryption probability of each of the EGs and the OGs;
- making, by the first engine and based on the updated encryption probability of each of the EGs and the OGs, a second determination that an encryption level of each of the EGs and the OGs is correct;
- providing, by the first engine and based on the second determination, the EGs and the OGs to a second engine of a node;
- aggregating, by the second engine, the EGs and the OGs with second EGs received from a second client to obtain an updated shared model; and
- deploying, by the second engine, the updated shared model to the first engine and a third engine of the second client.

2. The method of claim 1, wherein the database comprises the first dataset and a second dataset of the second client.

3. The method of claim 2,
- wherein a computing environment hosts the first client, the second client, and the database, and
- wherein the computing environment and the node are operatively connected to each other over a network.

4. The method of claim 1, wherein the first dataset comprises health information of a computing device of the first client, efficiency information of a workload being performed on the first client, energy consumption information of a second computing device of the first client while performing the workload, temperature information of the computing device, and an identifier of the first client.

5. The method of claim 1, wherein the first client is an Internet of Things (IoT) device.

6. The method of claim 1, wherein the set of parameters comprises weights and biases associated with the shared model.

7. The method of claim 6, wherein the set of gradients represents how the set of parameters should be updated to improve prediction accuracy of the shared model.

8. The method of claim 1, wherein the shared model is a logistic regression model.

9. The method of claim 1, wherein the updated shared model is obtained without exposing the first dataset to the second engine.

10. A method for managing a shared model, the method comprising:
- providing, by a first engine of a first client, a first dataset of the first client to a database;
- performing, by the database, preprocessing on the first dataset to obtain preprocessed data;
- providing, by the database, the preprocessed data to the first engine;
- training, by the first engine, the shared model using the preprocessed data;
- obtaining, by the first engine and based on the training, a set of gradients for a set of parameters of the shared model;
- analyzing, by the first engine and based on a second set of gradients for the set of parameters, the set of gradients to obtain a gradient flow for each of the set of gradients, wherein the second set of gradients is obtained from a second training of the shared model, wherein the second training is performed before the training;
- based on the gradient flow for each of the set of gradients and by the first engine:
  - applying homomorphic encryption on sensitive gradients of the set of gradients to obtain encrypted gradients (EGs), applying obfuscation on non-sensitive gradients of the set of gradients to obtain obfuscated gradients (OGs);

computing, by the first engine and using a privacy degradation parameter, an encryption probability of each of the EGs and the OGs;

making, by the first engine and based on the computing, a first determination that an encryption level of an EG of the EGs does not need to be updated;

retrieving, by the first engine and based on the first determination, a privacy history score of each of the EGs and the OGs;

obtaining, by the first engine and based on privacy history scores, an updated encryption probability of each of the EGs and the OGs;

making, by the first engine and based on the updated encryption probability of each of the EGs and the OGs, a second determination that an encryption level of each of the EGs and the OGs is correct;

providing, by the first engine and based on the second determination, the EGs and the OGs to a second engine of a node;

aggregating, by the second engine, the EGs and the OGs with second OGs received from a second client to obtain an updated shared model; and deploying, by the second engine, the updated shared model to the first engine and a third engine of the second client.

11. The method of claim 10, wherein the database comprises the first dataset and a second dataset of the second client.

12. The method of claim 11, wherein a computing environment hosts the first client, the second client, and the database, and wherein the computing environment and the node are operatively connected to each other over a network.

13. The method of claim 10, wherein the first dataset comprises health information of a computing device of the first client, efficiency information of a workload being performed on the first client, energy consumption information of a second computing device of the first client while performing the workload, temperature information of the computing device, and an identifier of the first client.

14. The method of claim 10, wherein the set of parameters comprises weights and biases associated with the shared model.

15. The method of claim 14, wherein the set of gradients represents how the set of parameters should be updated to improve prediction accuracy of the shared model.

16. The method of claim 10, wherein the shared model is a logistic regression model.

17. The method of claim 10, wherein the updated shared model is obtained without exposing the first dataset to the second engine.

18. A method for managing a shared model, the method comprising:

providing, by a first engine of a first client, a first dataset of the first client to a database;

performing, by the database, preprocessing on the first dataset to obtain preprocessed data;

providing, by the database, the preprocessed data to the first engine;

training, by the first engine, the shared model using the preprocessed data;

obtaining, by the first engine and based on the training, a set of gradients for a set of parameters of the shared model;

analyzing, by the first engine and based on a second set of gradients for the set of parameters, the set of gradients to obtain a gradient flow for each of the set of gradients, wherein the second set of gradients is obtained from a second training of the shared model, wherein the second training is performed before the training;

based on the gradient flow for each of the set of gradients and by the first engine:

applying homomorphic encryption on sensitive gradients of the set of gradients to obtain encrypted gradients (EGs), applying obfuscation on non-sensitive gradients of the set of gradients to obtain obfuscated gradients (OGs);

computing, by the first engine and using a privacy degradation parameter, an encryption probability of each of the EGs and the OGs;

making, by the first engine and based on the computing, a first determination that an encryption level of an EG of the EGs does not need to be updated;

retrieving, by the first engine and based on the first determination, a privacy history score of each of the EGs and the OGs;

obtaining, by the first engine and based on privacy history scores, an updated encryption probability of each of the EGs and the OGs;

making, by the first engine and based on the updated encryption probability of each of the EGs and the OGs, a second determination that an encryption level of an OG of the OGs is not correct;

updating, by the first engine and based on the second determination, the encryption level of the OG to an EG;

providing, by the first engine and based on the updating, the EGs and the OGs to a second engine of a node;

aggregating, by the second engine, the EGs and the OGs with second EGs received from a second client to obtain an updated shared model; and deploying, by the second engine, the updated shared model to the first engine and a third engine of the second client.

19. The method of claim 18, wherein the database comprises the first dataset and a second dataset of the second client.

20. The method of claim 19, wherein a computing environment hosts the first client, the second client, and the database, and wherein the computing environment and the node are operatively connected to each other over a network.

* * * * *